United States Patent
van der Veen et al.

(10) Patent No.: US 7,590,839 B2
(45) Date of Patent: Sep. 15, 2009

(54) SYSTEM EMPLOYING FAST BOOTING OF APPLICATION PROGRAMS

(75) Inventors: Peter van der Veen, Ottawa (CA); Colin Burgess, Ottawa (CA)

(73) Assignee: QNX Software Systems GmbH & Co. KG, Karlsbad (DE)

(*) Notice: Subject to any disclaimer, the term of this patent is extended or adjusted under 35 U.S.C. 154(b) by 434 days.

(21) Appl. No.: 11/385,253

(22) Filed: Mar. 21, 2006

(65) Prior Publication Data

US 2006/0282654 A1 Dec. 14, 2006

Related U.S. Application Data

(60) Provisional application No. 60/664,425, filed on Mar. 22, 2005.

(51) Int. Cl.
G06F 15/177 (2006.01)

(52) U.S. Cl. ............................ 713/2; 713/1
(58) Field of Classification Search ............ 713/2, 713/1
See application file for complete search history.

(56) References Cited

U.S. PATENT DOCUMENTS

| 5,269,022 | A  | * | 12/1993 | Shinjo et al. ............ 713/2 |
|---|---|---|---|---|
| 5,675,795 | A  |   | 10/1997 | Rawson, III et al. |
| 6,098,158 | A  | * | 8/2000  | Lay et al. ............ 711/162 |
| 6,173,417 | B1 | * | 1/2001  | Merrill ............ 714/15 |
| 6,434,696 | B1 | * | 8/2002  | Kang ............ 713/2 |
| 6,807,630 | B2 | * | 10/2004 | Lay et al. ............ 713/2 |
| 7,000,075 | B2 |   | 2/2006  | Beckert et al. |
| 7,036,040 | B2 |   | 4/2006  | Nicholson et al. |
| 7,051,160 | B2 |   | 5/2006  | Beckert et al. |
| 7,051,326 | B2 |   | 5/2006  | Goodman |
| 7,213,139 | B2 | * | 5/2007  | Zhang ............ 713/1 |
| 7,299,346 | B1 | * | 11/2007 | Hollis ............ 713/2 |
| 2004/0093489 | A1 |   | 5/2004 | Hsu |
| 2004/0143696 | A1 |   | 7/2004 | Hsieh |
| 2004/0260919 | A1 |   | 12/2004 | Takahashi |
| 2005/0229042 | A1 |   | 10/2005 | Crowell et al. |
| 2006/0277400 | A1 |   | 12/2006 | Veen et al. |

* cited by examiner

*Primary Examiner*—Chun Cao
(74) *Attorney, Agent, or Firm*—Brinks Hofer Gilson & Lione

(57) ABSTRACT

A fast booting system decreases the boot time of a computer system, and allows the fast launching of applications on a subsequent reboot. The fast booting system stores data associated with fast boot applications in a non-volatile memory. On a subsequent reboot, the fast booting system reads the data and launches the fast boot applications to decrease boot time.

17 Claims, 6 Drawing Sheets

SYSTEM EMPLOYING FAST BOOTING OF APPLICATION PROGRAMS

PRIORITY CLAIM

This application claims the benefit of U.S. Provisional Application No. 60/664,425, filed Mar. 22, 2005. The disclosure of the above application is incorporated by reference herein.

BACKGROUND OF THE INVENTION

1. Technical Field

The invention relates generally to a system for rapidly booting one or more application programs of a processing system to a prior operational state.

2. Related Art

Computers and microprocessor based control systems manage complex systems with a great degree of reliability. When employed in an embedded control format, such microprocessor based systems may be used to automatically execute complex tasks while providing a user interface which is comparatively simple.

One example of an industry in which users have begun to demand more complex environmental and entertainment services requiring computerized control systems to manage these services is the automobile industry. Automobile telematics systems may perform many functions, including recording the positions of the driver's seat and mirrors for different users, supporting entertainment applications such as broadcast radio, video games and playing movies, managing climate control systems such as heating and cooling systems, and providing Internet access, email and instant messaging services to passengers. A telematics system typically may provide a microprocessor, non-volatile memory, and I/O devices in the form of audio and/or visual devices, keyboards, or voice recognition systems.

Complex computer systems may take a great deal of time to "boot up." "Booting up" is the process of putting the computer in an operating mode in which it is ready to execute a predetermined function. Primary boot up operations may include the loading and initialization of the operating system, while secondary boot up operations may include the loading and initialization of one or more application programs subsequent to the primary boot up. To decrease the amount of time needed to execute a primary boot operations, system parameters indicative of the overall state of the system are transferred from volatile memory to non-volatile memory before the system is shut down or otherwise enters a hibernation mode. On subsequent primary boot operations, the system parameters previously stored in the non-volatile memory may be accessed to more quickly restore the system to its prior operating state. Similar operations may be executed in the context of a secondary boot of an application. For example, the Solaris operating system uses a command, Dldump, that is used to write all memory related objects from an application to a non-volatile memory for subsequent restoration. Although these techniques represent improvements in primary and secondary boot technologies, they are still open to improvements.

SUMMARY

A processing system for decreasing the boot time of application programs subsequent to the execution of primary boot operation is set forth that includes a volatile memory, a non-volatile memory, and a processor. The volatile memory and the non-volatile memory are each accessible by the processor. A boot program is executed by the processor to perform a full start-up boot routine, including launching an operating system. The boot program may respond to completion of the full start-up boot routine by halting execution of application threads. The operating system may read data and instructions from the volatile memory using the operating system, and store the read data and instructions to a non-volatile memory. The operating system may then respond to a secondary boot request with a "fast boot" of applications.

The fast boot may be accomplished by launching the operating system, reading the stored data and instructions and the corresponding memory addresses on the non-volatile memory using the operating system; copying the data and instructions read from the non-volatile memory to the corresponding memory addresses of the volatile memory, and beginning execution of the copied data and instructions to initiate a "fast boot" of applications.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
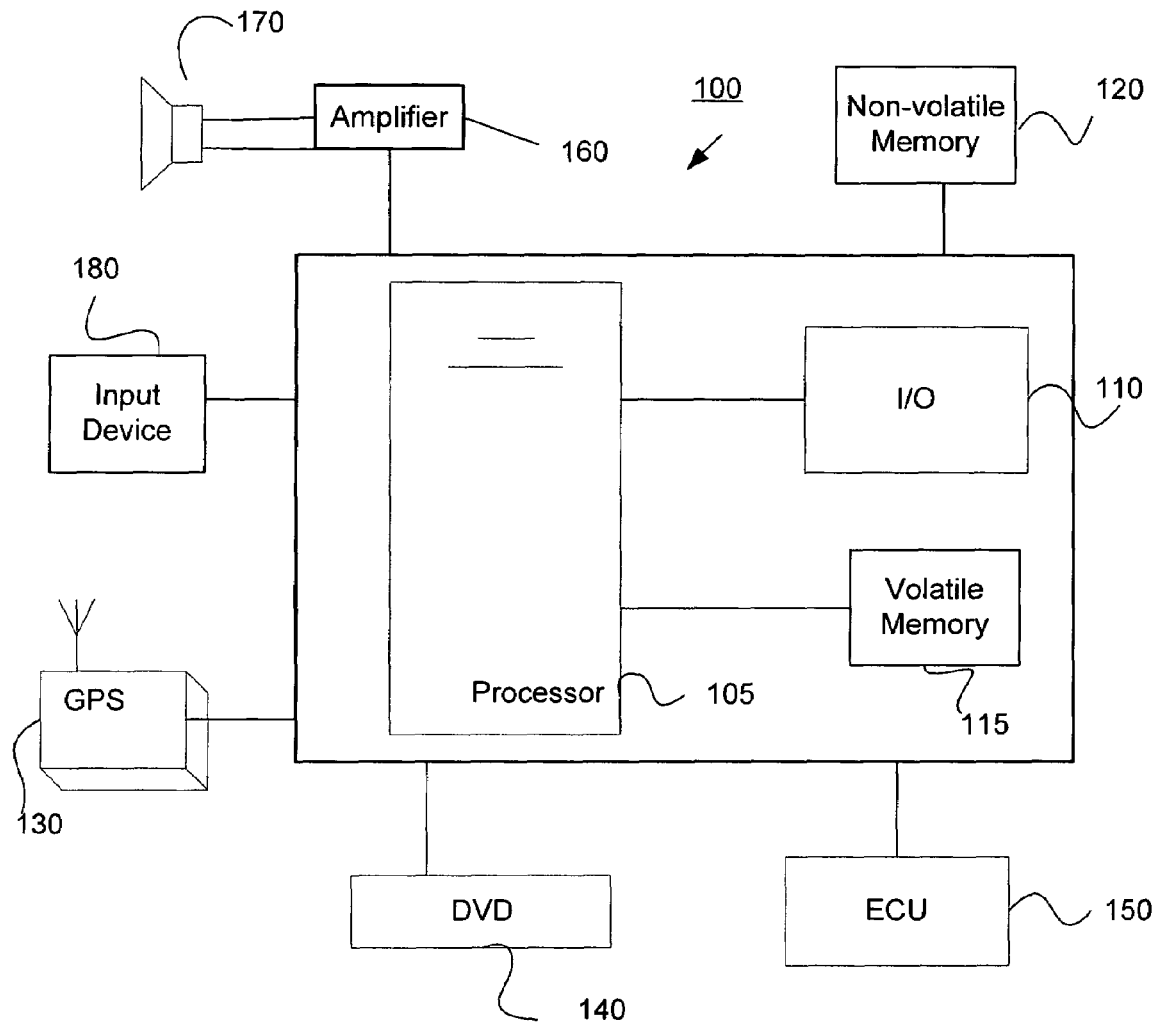
FIG. 1 presents a block diagram of an example fast boot system.

The fast boot method for a computer system, such as an automotive telematics system, may be performed in two stages. First, an image of the regular memory may be recorded on a non-volatile memory, using the resident operating system. Then, when the user wishes to perform a subsequent "fast-boot" of the system, this image may be restored, again, using the operating system to perform the data transfer. Generally, the control system requires in terms of physical hardware is a volatile memory for operation of the system, a non-volatile memory on which to record the image of the regular memory, and a processor of some kind, which can supervise the necessary reading, writing and processing performed by the operating system.

A system for fast booting 100 may include a unit for processing instructions, or a processor 105, an input/output unit (I/O) 110, a unit for storing data in a short-term manner, such as a volatile memory 115, and a unit for storing data in a long-term manner, such as non-volatile memory 120. The non-volatile memory 120 may be used for storage of bulk data such as movies and/or audio content. The system 100 may also include inputs such as a global positioning system (GPS) receiver 130 and a DVD unit 140. The system 100 may include outputs such as an amplifier 160, loudspeaker 170, or graphical display 180. Other examples of inputs include, but are not limited to, audio and/or video inputs, data inputs, vehicle operating parameter inputs, and other sources of information useful to a vehicle telematics unit. The processor 105 may be configured to run an operating system with instructions to boot and operate the system 100.

Microprocessors commonly used in telematics applications are the PowerPC™ (or PPC), XScale™ and Renesas™ SH families of microprocessors. The processor 105 may perform arithmetic calculations and control functions to execute software stored in the volatile memory 110, which is generally random access memory (RAM) and/or read only memory (ROM). The non-volatile memory 120 may be in the form of a hard disk drive, floppy disk drive, magnetic tape drive, compact disk drive (CD-ROM), Digital Video Disk (DVD), Flash memory, removable memory chips such as EEPROMs, or similar storage media. The non-volatile memory 120 may be physically internal to the computer, or external.

The I/O interface 110 may administer control of the output devices (160, 170, and 180). Typically, audio speaker systems consist of an audio amplifier 160 and a plurality of speakers 170 installed in various locations within the vehicle. The display screen 180 may have a bi-directional connection to the computer, and it may include a touch-sensitive input screen. Users may identify menu selections or issue commands by touching icons or text on the display screen 180, and these selections are passed to the processor 105 for processing. One display screen 180 is generally installed on the center console of the vehicle and is positioned to face the driver, providing easy access to road map information, for example. Other display screens, such as those in the back seat of the vehicle, may be optimized to provide other services such as the playing of movies. Other output devices, of course, may also be included as part of the system.

Various input devices may be also supported by the computer, including an alpha-numeric keyboard and a microphone for receiving voice commands (not shown). Voice commands may be processed using voice-recognition software so that the user is not required to use his hands to operate the system while driving. Accommodation may also be included for other user input devices such as track-balls, mouses, joysticks, game controllers and dedicated input devices.

A computer system, such as a telematics system, may also include a GPS receiver 130, which passively receives satellite signals using an antenna and performs calculations to determine the geographic position of the vehicle. A DVD player or CD-ROM player 140 may also be used to provide audio and/or video content to the system. Also shown is a connection to the engine control unit 150 (ECU) of the vehicle, which may provide the computer with data such as the speed and operating condition of the vehicle.

The computer may be directly connected to any of the vehicle's control systems, though telematics systems are typically not arranged to supervise any mission-critical systems, such as braking or steering. The computer may also interface with various vehicle performance sensors such as: the speedometer, revolutions per minute indicator (tachometer), oil pressure sensor, tire pressure sensor, oil temperature sensor, coolant temperature sensor, gas tank gauge and battery voltmeter. Typically, these interconnections will be made via the ECU or a similar controller. A telematics system may include external devices such as a telephone, a laptop computer, and a wireless transmitter/receiver.

A laptop computer may typically communicate with the computer via some form of communications interface such as a modem, an Ethernet card, a serial or parallel communications port. Software and data may be transferred in the form of electronic, electromagnetic, optical or other signals. The wireless transmitter/receiver may typically be one of the cellular telephone based systems, capable of interconnecting the hardwired car telephone to the cellular network, and also communicating digital data using cellular digital packet data (CDPD) or some similar system. Cellular telephone specifications are relatively standardized within different jurisdictions. In North America, for example, it is common to use code division multiple access (CDMA) for digital cellular services and Advanced Mobile Phone Service (AMPS) for analog services, while in Europe, Groupe Systeme Mobile (GSM) is the digital standard.

Other wireless protocols may also be used. For example, a Bluetooth and wireless local area network (LAN) technology may be used to implement an eGasStation concept, where the vehicle telematics system may interact with a service station to wirelessly transact business. Bluetooth may also be used to synchronize the computer with the user's home or office computers while the vehicle is parked nearby, or to synchronize with the user's portable laptops, PDA or notebook computer while the user is driving the vehicle. A typical automobile telematics system may include a wireless base station (or often a network of such base stations), which may be operable to communicate with the wireless receiver/transmitter of the automotive telematics system. The base station may be connected to the Public Switched Telephone Network (PSTN) so that traditional audio telephone calls may be made, and to the Internet Network, via some form of server or servers. Thus, the gateway may be used, for example, to provide the vehicle system with access to the PSTN and the Internet, and also to send data and software to and from the server. The application is described with respect to an automobile telematics application, but may also be implemented in other dedicated control systems.

Figure 2:
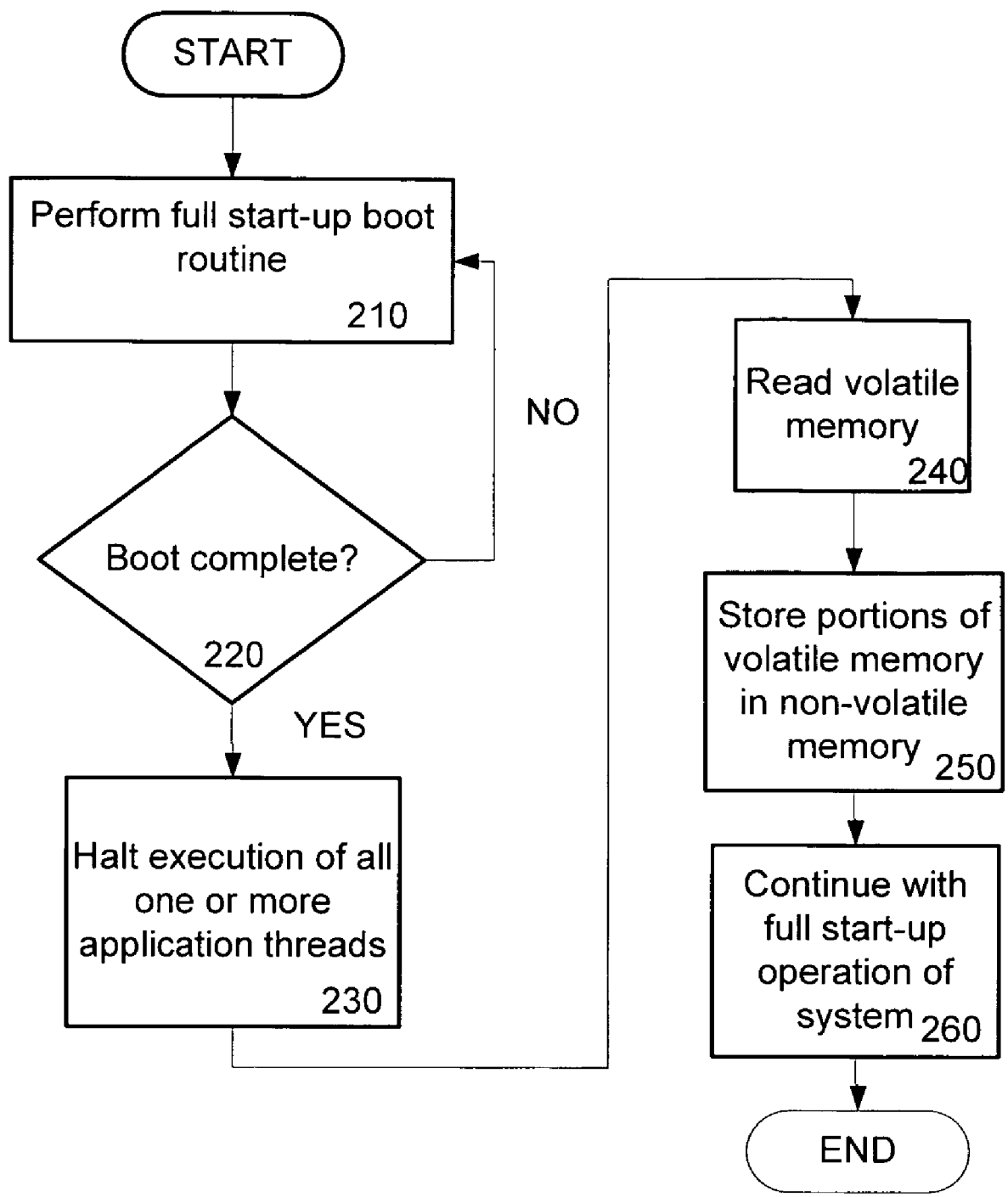
FIG. 2 presents a flow chart of a method of increasing boot speed.

FIG. 2 illustrates interrelated acts taken to increase boot speed in a computer system, such as a dedicated control system. A boot program, run by the processor 105 of system 100, may perform a full start-up bootup, at block 210. The bootup of the system may include such tasks as powering up, launching the operating system, performing self-checks and tests, initializing hardware, interface cards and peripherals, determining which software applications may be launched, launching software applications, and determining and making connections to other modules, inputs, or outputs to the system 100. When the execution of the boot routine has been completed, the volatile memory may now be in such a state that the control system is ready to operate. The process may now store an image of this regular memory state, so that the memory may be returned to this state at a later time.

If the operating system determines that boot-up is complete, at block 220, the image of the volatile memory is "frozen" by halting the execution of all one or more application threads, such as all the non-os threads in an application program to be fast booted, at block 230. Other non-related non-operating system threads may not be affected. If boot-up is not complete, the boot program may attempt to perform a full start-up bootup routine again, at block 210. The volatile memory 115, which may contain data and instructions stored by the system during the boot process, may now be read by the operating system, at block 240, and portions of the data and instructions read from the volatile memory 115 are stored in the non-volatile memory 120 of the system 100, at block 250.

When the operating system reads and records the data and instructions stored in the non-volatile memory 120, the addresses of these data and instructions in the volatile memory 115 may also have to be recorded in some way so that the system knows where the data and instructions must be returned to. If the data and instructions are not returned to the correct locations in the volatile memory 115, the system 100 may not operate properly. Once the image of the volatile memory 115, at the end of the boot process, has been stored in the non-volatile memory 120, the system may perform a "fast boot" when required. The system 100 then may continue with a full start-up operation, at block 260.

Figure 3:
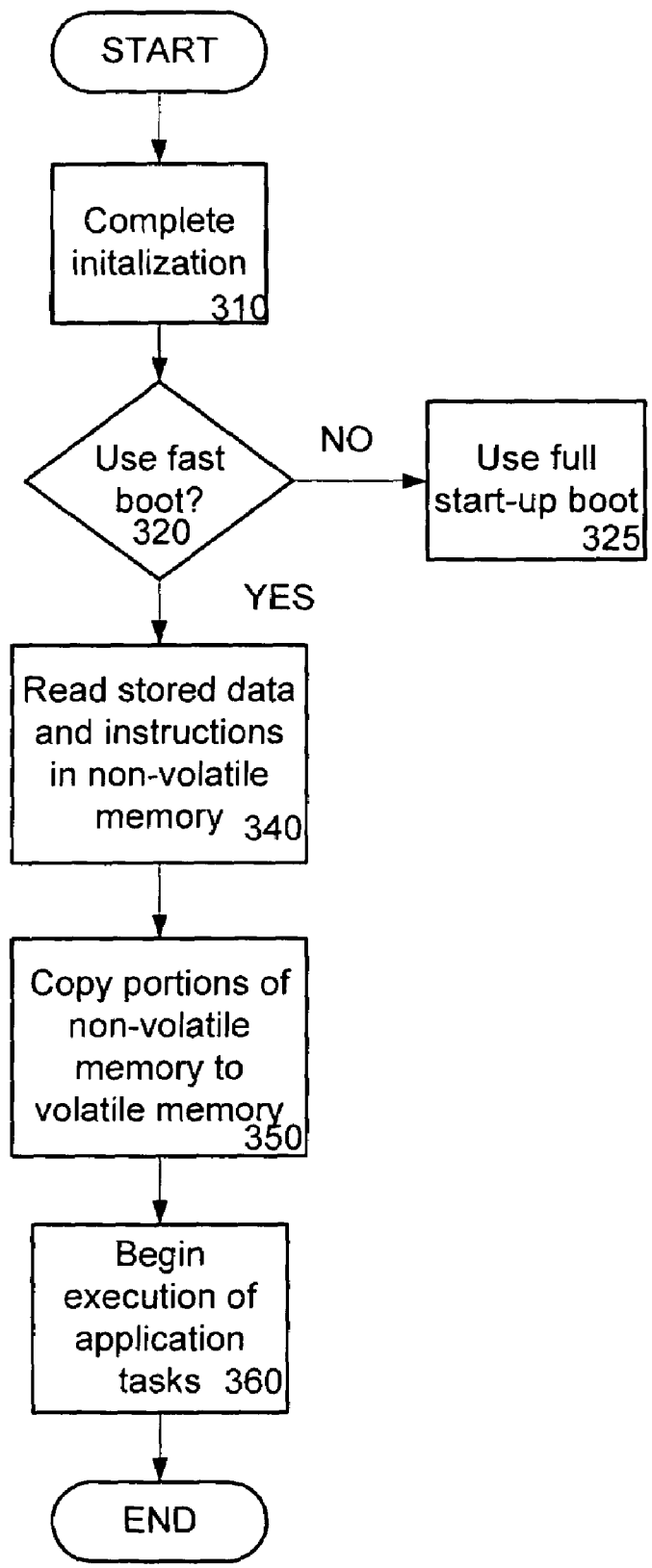
FIG. 3 presents a flow chart of a subsequent restoring routine.

FIG. 3 illustrates interrelated acts taken to implement a subsequent "fast boot" restoring routine. The processor 105 may complete an initialization of the system, such as by launching the operating system, at block 310. The operating system may determine, at block 320, if a request for a "fast boot" is indicated. If a "fast boot" is not indicated at block 320, the operating system may initiate a full start-up boot routine, at block 325. The decision could be effected in many ways. For example, a flag may be set when new software or hardware is installed, indicating to the system 100 that a full re-boot be performed, so the new components may be recognized and initialized.

The operating system may read the data and instructions stored on the non-volatile memory 120, as well as the corresponding memory addresses of these data and instructions, at block 340. The processor 120 then copies portions of these stored data and instructions to their corresponding memory addresses in the volatile memory 115, at block 350, so that the volatile memory 115 will then have the image from the non-volatile memory 120. The system 100 may then begin regular execution of application tasks, which may use the copied data and instructions, at block 360.

The concept of "fast booting" may be contrary to the usual philosophy of booting up. It may be generally desirable, for example, that booting start at the lowest level of the system 100, and deliberately go through the same rigorous and detailed process each time the system 100 is booted—checking the system 100 to see what new components may have been installed, checking boot or start-up files to see what applications must be launched, and launching the currently stored copies of those applications so that the volatile memory 115 may be filled with the most current version. All of this may be done so that any changes are addressed in a transparent way. Automatically, when the system is booted, the most recent instructions are considered, and the most recent versions of software may be loaded.

However, many dedicated control systems, such as automotive telematic systems, are static systems—especially at the boot level. A vehicle may be re-started hundreds of times, over months and months, without any changes made to the boot routine. As well, any changes that are performed may often be made at a higher level, such as at the software application level, so that boot image will still remain unaffected. It is therefore acceptable in such environments, to perform fast boots.

Figure 4:
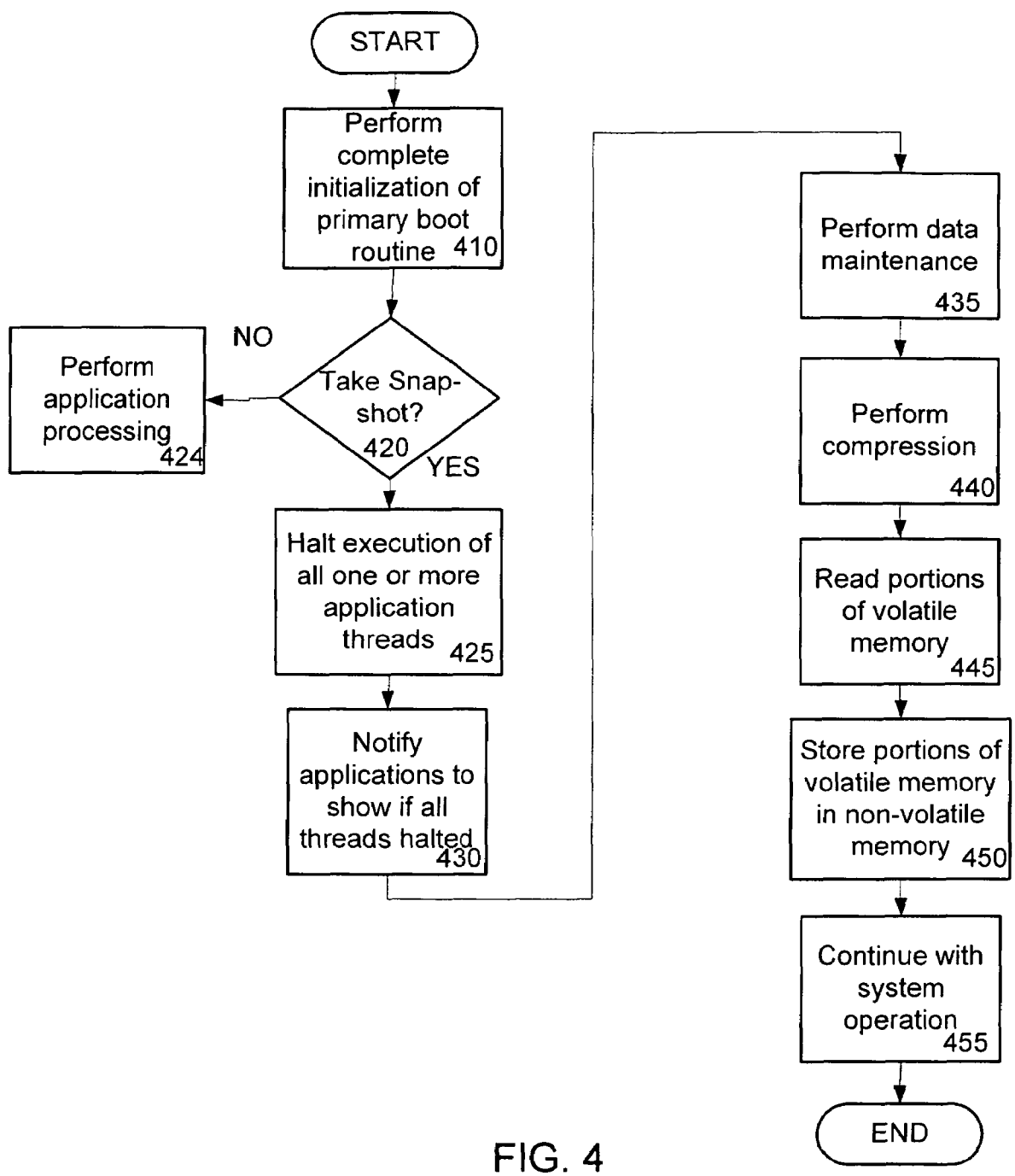
FIG. 4 presents a flow chart of an initial boot-up routine in an example computer system.

FIG. 4 illustrates acts to implement an initial boot-up routine, such as for a processor in a Java and Open Systems Gateway Initiative (OSGI)-based automotive telematics system. Java is a programming language which allows software designers to develop a single version of a software application that will be able to run on any hardware platform. With most programming languages, application programs are compiled into files of machine dependent, executable machine code. Java code, however, is compiled into machine-independent byte-code which is executed by a machine-dependent Java virtual machine (Java VM). A class loader (not shown) is responsible for loading byte-code class files as needed, and an interpreter connects the byte-code into machine code. The Java class library contains pre-compiled Java classes, such as classes for input/output and window management operations.

Java's platform-independence and effective security may provide a good environment for automotive telematics systems. Content or service providers need not concern themselves with the wide variety of hardware platforms in use, while end users are generally protected against hackers and viruses. In addition, Java application program interfaces (APIs) are available to support a broad range of services, such as speech recognition through Java Speech API (JSAPI), media delivery through Java Media Framework (JMF) and wireless telephony through Wireless Telephony Communications APIs (WTCA).

The OSGI is a Java framework that allows various services and applications to be downloaded and they will operate independently of the underlying computer hardware and software. OSGI allows applications (referred to as "bundles"), to be written and distributed widely, with the OSGI managing the life cycle, Java packages, security and dependencies between applications. Java applications consist of classes placed in packages, a Java package being an indivisible unit of a set of related classes.

The OSGI may allow several applications to share a single Java VM, and integrity may be assured by not allowing dangerous functions to be executed. Different bundles (even from different vendors) may implement the same interface, and bundles may even collaborate through service objects and package sharing, where a service is an object registered with the OSGI framework by a bundle, to be used by other bundles.

The OSGI and Java VM run on top of a traditional operating system, which provides an interface with hardware via drivers. In dedicated control systems and automotive telematics systems, the operating system is generally an embedded, real-time, operating system. Embedded operating systems are designed to be less comprehensive but much more resource efficient than operating systems for regular personal computers. Real-time operating systems are designed to respond to events within a given time period, for example, outputting audio or video content without perceptible interruptions, or responding to user's inputs within fractions of a second (which is required, for example, when playing video games). The application may use the QNX™ Neutrino™ operating system, which is Portable Operating System Interface for UNIX (POSIX) compliant. POSIX requires functionality for specifying where to position the stack and what the size is, so when a thread is created, the developer may give it the location of the stack to use (using the pthread_attr_setstackaddr and pthread_attr_setstacksize functions), and that way the developer has full control over it. POSIX is a set of IEEE and ISO standards that define an interface between programs and operating systems. By designing their programs to conform to POSIX, developers have some assurance that their software can be easily ported to POSIX-compliant operating systems.

The Java VM and OSGI-based method for fast booting may be implemented in two phases: an initial startup or "snapshot" phase in which an image of the memory is recorded after the completion of booting up, and subsequent "fast boot" phases in which the system is quickly restored to the "booted-up" state. The operating system may perform a complete initialization of a primary boot routine at block 410. The operating system determines whether to implement a "snapshot" routine, at block 420.

Figure 5:
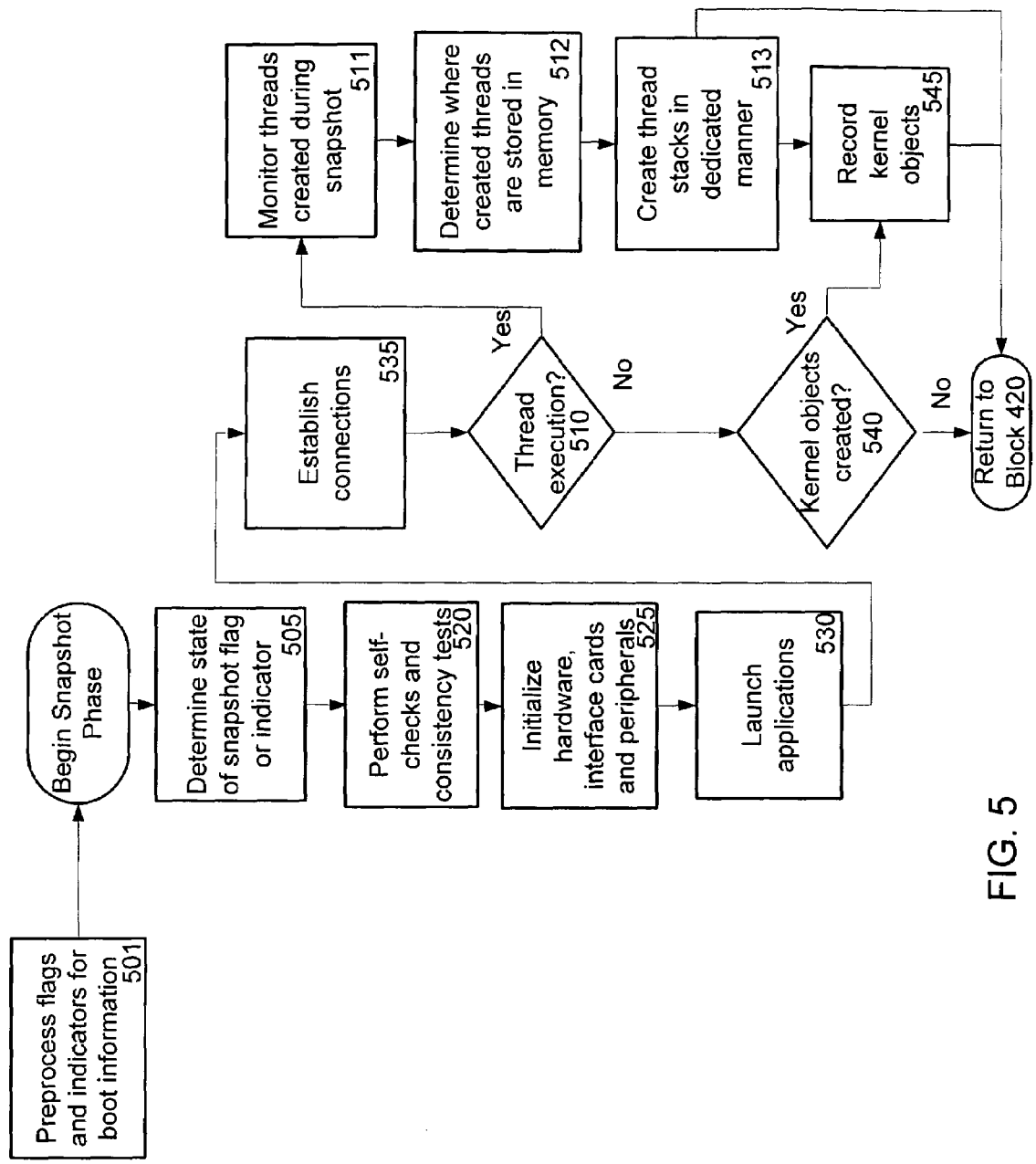
FIG. 5 presents a flow chart of a subsequent restoring routine in an example computer system.

FIG. 5 illustrates the snapshot phase, of block 420, in more detail. Prior to the snapshot phase, the operating system may pre-process, at block 501, certain initialization files for boot information, such as by setting flags or other boot indicators. These flags and indicators provide information on whether a snapshot routine needs to be performed. The processor 105 may determine, at block 505, a state of the snapshot flags or indicators, by searching these flags or indicators from block 501. After the snapshot phase initiates, the system 100 may initiate blocks associated with normal boot-up of the operating system, which may include: performing self-checks and consistency tests, at block 520; initializing hardware, interface cards and peripherals, at block 525; determining which software applications to launch as part of the start-up process, and launching those software applications, at block 530; and determining which standard connections to make as part of the start-up process, and making those connections, at block 535.

Execution of threads may proceed at block 510, during the snapshot phase. The operating system may determine if thread execution proceeds, at block 510. If thread executions proceeds, the operating system may monitor, at block 511, which threads are created, and may determine, at block 512, where the threads may be stored in memory. Because both the snapshot and restore phases are supervised by the operating system, care must be taken to prevent the execution of the operating system from adversely affecting the memory image that is being stored and re-stored. The programmer may typically control what portion of memory the operating system uses to perform its own processing, and may avoid that area of memory when reading and restoring the regular memory.

A more difficult problem may occur when the thread stack has to be restored to exactly the same spot that it was in the original boot up. One way to ensure that this restoration occurs may be to create the thread stacks in a dedicated manner, at block 513, for every thread that is created by the Java VM, instead of letting the system create the thread stacks. This same routine could be used for both the initial boot up and subsequent fast-boots, so the threads are placed precisely and consistently.

Execution of the snapshot may determine if kernel objects are created during the life of the program, at block 540. Basically, all the kernel objects have to be invoked or accessed through a control module, such as the Java VM, so whenever a kernel object is created by the control module, the control module records what those objects are, at block 545. The kernel objects may be synchronization objects, threads, or similar software mechanisms. Then, when the save part of the fast boot is performed, a list of all of the objects stored in memory will be in the non-volatile memory. When restoring, this list of objects will be reviewed, so the objects can be restored to the state that they were when the save was done. Control may then be returned to block 420.

Synchronization objects and threads may be difficult objects to handle. Certain thread properties, like thread stack locations, must be matched as well. Because a control module, such as the Java VM, may be very contained in what kernel objects it uses, object handling may be made easier. Mutual exclusion objects (mutexes) also may be recorded. A mutex is a program object that allows multiple program threads to share the same resource, such as file access, though not simultaneously. When a program is started, a mutex is created with a unique ID. Any thread that needs the resource must lock the mutex from other threads while the thread is using the resource. The mutex may be set to unlock when the data is no longer needed or the routine is finished. A record must be kept of each mutex so it can be restored when the memory image is restored.

The system 100 also may remember which file handles came up during the initial boot, so that they can be restored as well. A file handle is a number that the operating system assigns temporarily to a file when it is opened. The operating system may use the file handle internally when accessing the file. A special area of main memory may be reserved for file handles to identify the file handles and ensure that all of the files which were opened during the initial boot-up will also be opened in subsequent fast-boots. Similarly, data may be recorded regarding connections to networks, initialization of hardware cards or firmware and the like. While booting, the method allows a Java application to register to have call outs which will save or disconnect a connection. A record must be made of these call outs. Then when the program is restored, call outs can be made to allow those connections to be re-established.

QNX Neutrino already has all of the tools needed to interrogate the full system state, apart from accessing non-persistent data in the Java VM. To deal with this, new code has been added to the Java VM to record this data. Thus, QNX Neutrino is already set up to access all of the data required—the state of all the registers and flags, and everything inside the kernel. Because QNX Neutrino is a POSIX operating system, it may run on almost any POSIX operating system. The software code which performs the snapshot, at block 420, is implemented as a subroutine or class. Thus, as part of the initial startup, and following the rest of the startup, this routine or class may be called.

If the operating system determines that a snapshot of the boot up is not required, then processing continues in the regular manner at block 424. Otherwise, application processing continues with block 425. Execution of all one or more application threads may be stopped, at block 425, except those related to the operation of the snapshot routine itself. This may be done by blocking all non-operating system threads, Java threads, or threads of execution. At block 425, only the snapshot thread may be processed. Every other thread is now at a well known, halted state.

The operating system notifies software applications and component drivers to show if all threads are halted, at block 430. The operating system may advise the applications to store all of the data and state information that may be required for re-starting. That is, the operating system issues a call out to every thread, such as a Java bundle, to say "close all your states." If the application needs anything else saved, the application may perform whatever saving and restoring may be needed. The main routine may provide a mechanism for calling applications before shutting down and after starting up, so these applications may do whatever saving and restoring may be required. A third party application may also perform this main routine.

The API of the QNX Neutrino operating system provides a mechanism for this call out. Alternatively, the OSGI framework may be modified to include this, so that applications which are using OSGI will not have to worry about call outs and they may be covered within the OSGI or the net framework.

Before saving the state of the system, the operating system may perform data maintenance, at block 435, where the data may be simplified and cleaned up. In Java, everything is accessed through a reference, so the location of a piece of code in memory is not determinate. To move something around in memory, the reference is moved. The application may perform the data maintenance by identifying the objects that are needed, putting them as close together as possible, and then zeroing objects not needed. The compression may save memory and speed up the process of saving and restoring. This procedure may use a Java class called "Garbage Collect." The Java VM may store all objects created by an executing Java program. Objects may be created by Java's "new" operator, and memory for new objects may be allocated at run time.

Data maintenance, such as through "Garbage Collection," at block 435, may include a process of automatically freeing objects that are no longer referenced by the program. The data maintenance may remove the Java objects in memory which are not being used. Modifying an operating system module, such as the Java VM, to zero all unreferenced memory when garbage collection is done may improve the compression described later. To allow faster decompression, the garbage collection procedure may also pack all reference data structures together, making fewer and larger zeroed areas. The programmer therefore does not have to keep track of when to free allocated memory. When a "garbage collect" is used at block 435, all state-related information may be harvested from the system memory, including objects, stacks, register values, flags set and related information.

The time required to perform data maintenance may not be critical. The time required to fast-boot may be a higher priority, and performing the garbage collection, at block 435, may actually make fast-boots much quicker, as there may be less data to read from the non-volatile memory when fast-booting, and store to the volatile memory. At this point, everything in the memory is at a halted state. A data compression process may be performed, at block 440, to reduce the amount of memory required to store the content. A compression technique ("runs of zeros" compression) may be used so that the fast-boot will still occur quickly. Techniques which result in a greater degree of compression may be implemented, but they may take too much time to execute to be practical.

Run length encoding is a compression algorithm which replaces sequences ("runs") of consecutive repeated characters (or other units of data) with a copy of the character itself and a number indicative of the number of times that character appears in the run. The longer and more frequent the runs are, the greater the compression that will be achieved. "Runs of zeroes" is a subset of "run-length encoding", where only sequences of zeroes are considered.

The operating system may access portions of the volatile memory 115 at block 445 and may begin to read the data and code along with their memory locations. Portions of the read information may then be stored on a non-volatile memory medium 120 at block 450. Typically, this will be a local memory such as a hard disk drive, CD-ROM, DVD, tape drive, Flash memory or floppy disk. This memory 120 may also be remote from the vehicle, such as data transferred to and from the vehicle via a wireless connection. A snapshot of the system at the end of the boot-up process may thus be stored on a non-volatile memory medium 120 so that it can be used to restore this state when a subsequent boot up is required. System operation may continue, at block 455.

Figure 6:
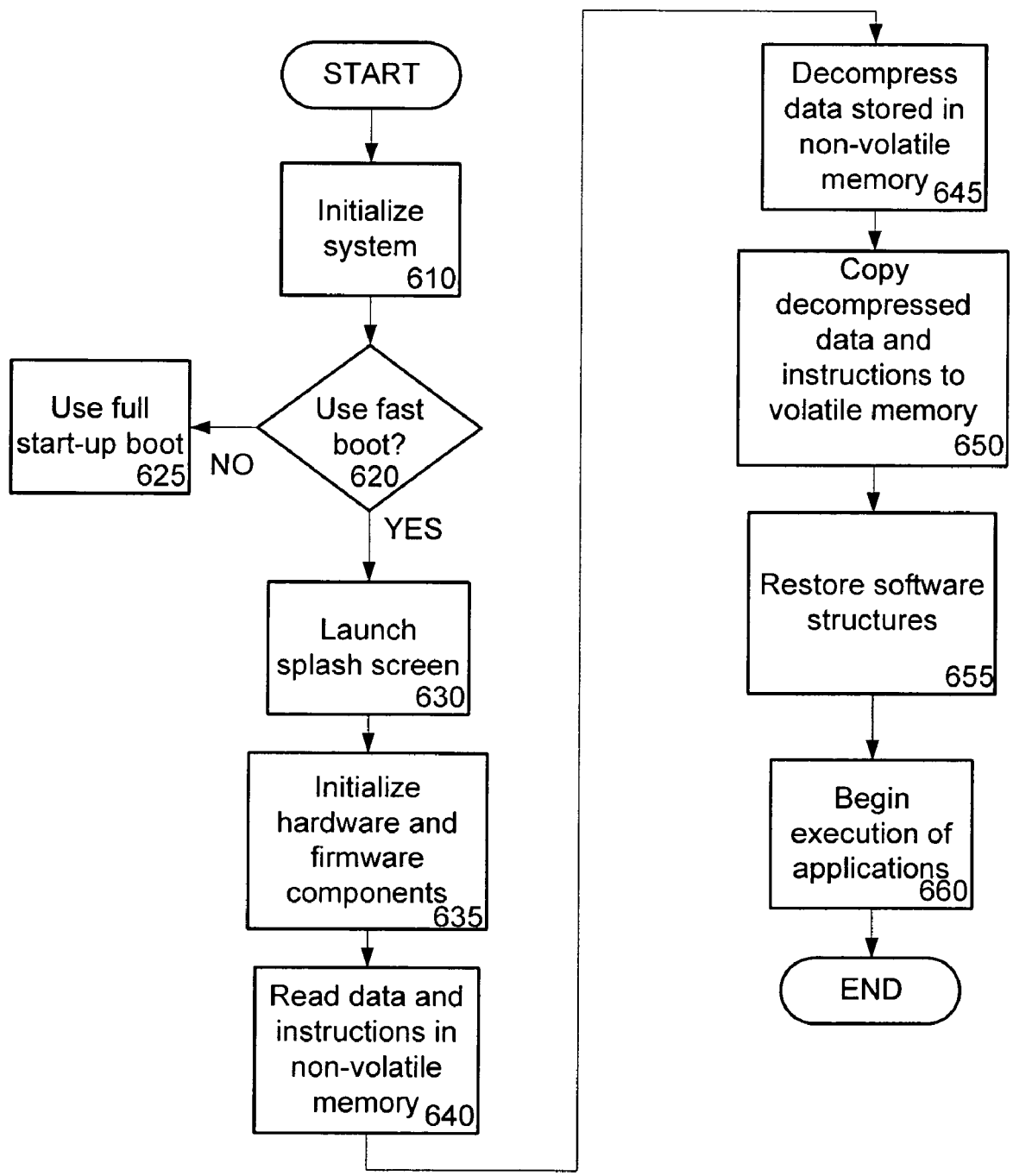
FIG. 6 presents a flow chart of a snapshot phase of a fast boot routine.

FIG. 6 illustrates example interralated acts taken to implement a fast-booting phase. The system 100 may initialize, at block 610, such as by powering up devices and launching the operating system (OS). However, a test may be added once the operating system has been loaded, which may determine, at block 620, whether the stored image of a previous boot up is to be used (i.e. a fast-boot), or whether a full start-up boot up is performed. Like the test at block 420 as depicted in FIG. 4, this test may, for example, search for a flag of some kind which indicates that new software, a new software version, or a new computer card has been added to the system, and that the system 100 should be booted up from first principles.

When personal computers are booted, the operating system may check a start-up or boot file, to see what actions to perform. This start-up is important on personal computers where the end user may forget about changes that were made, or not realize that modifications have made to the system that have an impact on the boot routine. It is also standard practice in large offices, where software upgrades may be made or patches installed without the end users being aware. By launching a start up or boot file each time the system is powered up, the system will always be booted up properly. Automotive telematics applications may be different though. For the most part, these systems are private and are isolated from other systems, so modifications are far less common. Thus, the system does not have to go back to check the start up or boot file every time the system is started.

If it is determined, at block 620, that the system should be booted from first principles, then control may passed, at block 625, so that the regular boot sequence is performed, otherwise, control passes to block 630. A splash screen of some kind may be presented to the end user, at block 630, demonstrating that the system is indeed coming back online, and also providing a few seconds required to fast boot the system. Hardware and firmware components may now be initialized, at block 635, and related subsystems may be activated. The particulars of how the hardware and firmware components are initialized may depend on the nature and specifics of these components.

The data and instructions, along with their addresses, may be retrieved, at block 640, from the non-volatile memory. Because these data are in a compressed form, they must be decompressed, at block 645, before they can be used for processing. The decompression at block 645 is the inverted operation of the "runs of zeroes" compression performed at block 440 in FIG. 4. The decompressed data and instructions may then be copied to the regular memory at block 650.

Software structures, such as file handles, kernel objects and mutexes are then restored, at block 655. While these components and structures are being restored, they are still "blocked", so they will not operate. The particulars of how this block is performed will depend on the nature of these components and structures. Once all of these items have been addressed, the threads may be unblocked, and regular processing may proceed at block 660. The main advantage of the application is that the time required to boot up may be drastically reduced. Existing systems may take several minutes to boot, while the system of the application may reduce boot up time to several seconds.

The fast booting system may bring the system 100 online in stages, part by part, beginning with the operating system, followed by drivers and subsystems, and then applications which interact with external devices. The functionality of each successive stage being usable as it comes online. A splash screen may be presented on a display before any of the stored content is accessed at all. The same, of course, may be done with any subsystem, including any hardware, software or firmware component.

The fast booting system may target particular parts of the system and/or memory selectively, so it may be far more resource efficient. Furthermore, the fast booting system may also allow data to be compressed before storing. The compression algorithm may be changed as the system 100 requires.

The fast booting system may allow the re-initialization of connections, hardware components, cards, peripherals and software applications. Any processing that may be performed during a full start-up booting may be performed by the fast booting system. The fast booting system may be implemented on different platforms. As well, additional functionality may be added. For example, an outcall may be performed as part of the snapshot sequence, to save the graphic state. In the short term, this may consume considerable memory and slow the saving and restoring process down excessively. However, as microprocessors become more powerful and various components become faster, this may become practical.

Like the method shown in FIGS. 2-6, the sequence diagrams may be encoded in a signal bearing medium, a computer readable medium such as a memory, programmed within a device such as one or more integrated circuits, or processed by a controller or a computer. If the methods are performed by software, the software may reside in a memory resident to or interfaced to the fast booting system 100, a communication interface, or any other type of non-volatile memory 120 or volatile memory 115 interfaced or resident to the fast booting 100. The memory may include an ordered listing of executable instructions for implementing logical functions. A logical function may be implemented through digital circuitry, through source code, through analog circuitry, or through an analog source such as through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The fast booting system may be adapted for use in different mobile vehicle platforms. Vehicles may include any device or structure for transporting persons or things. These fast booting systems may be used in portable systems or on vehicles such as automobiles, trucks, farming equipment, mining equipment, golf carts, motorized off-road vehicles, motorcycles, mopeds, and mobile robots. These fast booting systems may also be used in sea-borne or air-borne vehicles such as ships, airplanes, helicopters, spacecraft, balloons, and gliders.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A computer system comprising:
    a volatile memory;
    a non-volatile memory; and
    a processor, in communication with the volatile memory and the non-volatile memory,
    software code executable by the processor to:
        perform a boot routine, including launching an operating system;
        respond to a completion of the boot routine by:
        executing a data maintenance operation in which software objects, generated during the boot routine but no longer used by the system, are removed from the volatile memory;
        moving at least some software objects generated during the boot routine so that they are proximate one another in the volatile memory;
        reading data and instructions from the volatile memory; and
        storing the read data and instructions, and a corresponding memory address for the data and instructions, in a non-volatile memory; and
        respond to a subsequent request to boot by reading the stored data and instructions, and the corresponding memory address from the non-volatile memory.

2. The computer system of claim 1 where the software code further comprises software code executable by the processor to respond to completion of the regular boot routine by halting execution of all non-operating system threads.

3. The computer system of claim 2 where the software code further comprises software code executable by the processor to respond to a subsequent request to boot by:
    launching one or more applications;
    copying the data and instructions read from the non-volatile memory to the corresponding memory addresses of the volatile memory; and
    beginning execution of the copied data and instructions.

4. The computer system of claim 1 further comprising a plurality of input units under control of the processor.

5. The computer system of claim 4 where the input units are selected from the group consisting of: a DVD player, a global positioning system (GPS) unit, and an engine control unit (ECU).

6. The computer system of claim 4 further comprising a graphical display under control of the processor.

7. The computer system of claim 4 further comprising an audio output unit under control the processor.

8. The computer system of claim 1 where the software code further comprises software code executable by the processor to:
    notify applications running on the operating system to save data prior to executing the data maintenance operation; and
    compressing the data after executing the data maintenance operation.

9. The computer system of claim 8 where the software code further comprises software code executable by the processor to:
    determine if a snapshot routine needs to be completed after performing the boot routine;
    launch a fast boot application;
    perform one or more consistency checks;
    initialize hardware, one or more interface cards, or one or more peripherals;

establish required connections to the input units;
determine if threads are executed; and
determine if kernel objects are created.

10. A method of decreasing boot time of a computer system subsequent to the performance of an initial booting comprising:
performing a boot routine using a volatile memory;
responding to completion of the regular boot routine by:
executing a data maintenance operation in which software objects, generated during the boot routine but no longer used by the system, are removed from the volatile memory;
moving at least some software objects generated during the boot routine so that they are proximate one another in the volatile memory;
reading data and instructions from a volatile memory; and
storing the read data and instructions, and corresponding memory addresses for the data and instructions, in a non-volatile memory; and
responding to a subsequent request to boot by reading the stored data and instructions, and the corresponding memory addresses from the non-volatile memory.

11. The method of claim 10 where responding to completion of the boot routine further comprises halting execution of all application threads.

12. The method of claim 10 where responding to a subsequent request to boot further comprises:
launching the operating system;
copying the data and instructions read from the non-volatile memory to the corresponding memory addresses of the volatile memory; and
beginning execution of the copied data and instructions.

13. The method of claim 8 where performing a boot routine comprises launching an operating system.

14. The method of claim 10 further comprising:
notifying applications running on the operating system to save data;
executing the data maintenance procedure after the applications running on the operating system have saved the data; and
performing a compression operation on the data.

15. The method of claim 10 further comprising:
determining if a snapshot routine needs to be completed after performing the boot routine;
performing consistency checks;
initializing hardware, interface cards, or peripherals;
establishing required connections to the input units;
determining if threads are executed; and
determining if kernel objects are created.

16. The method of claim 15 where determining if threads are executed further comprises:
monitoring threads created during the snapshot routine;
determining where the created threads are stored in the non-volatile memory; and
generating thread stacks for storage in the non-volatile memory.

17. The method of claim 15 where determining if kernel objects are created further comprises recording created kernel objects in the non-volatile memory.

* * * * *

UNITED STATES PATENT AND TRADEMARK OFFICE
CERTIFICATE OF CORRECTION

PATENT NO. : 7,590,839 B2 Page 1 of 1
APPLICATION NO. : 11/385253
DATED : September 15, 2009
INVENTOR(S) : van der Veen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,590,839 B2
APPLICATION NO. : 11/385253
DATED : September 15, 2009
INVENTOR(S) : Peter van der Veen et al.

Page 1 of 1

It is certified that error appears in the above-identified patent and that said Letters Patent is hereby corrected as shown below:

In the Claims

In column 14, line 2, after "method of claim" replace "8" with --10--.

In column 14, line 5, after "applications running on" replace "the" with --an--.

Signed and Sealed this
Third Day of May, 2011

David J. Kappos
*Director of the United States Patent and Trademark Office*